UNITED STATES PATENT OFFICE.

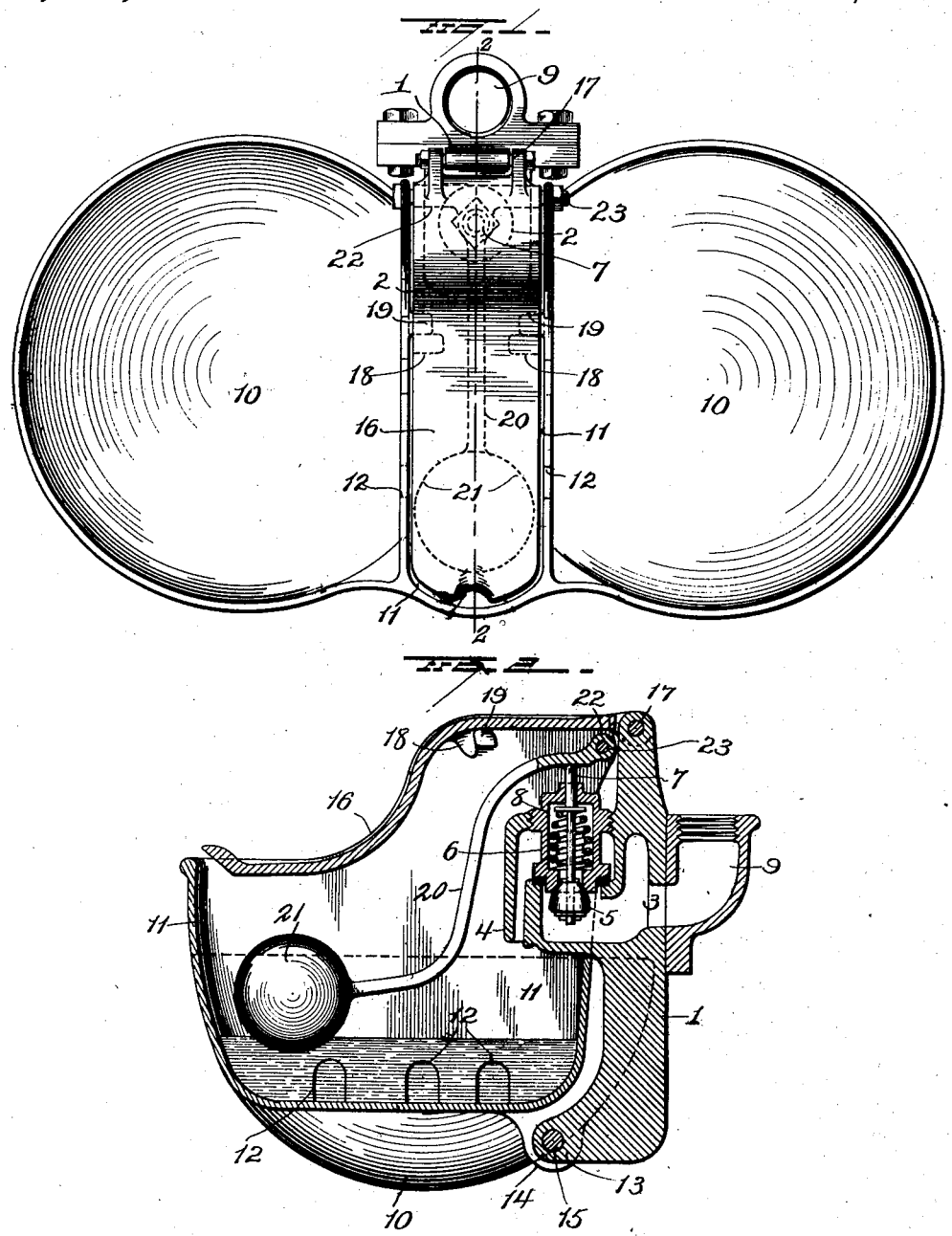

HUGO C. RASSMANN, OF BEAVER DAM, WISCONSIN.

WATERING DEVICE FOR STOCK.

1,327,734. Specification of Letters Patent. Patented Jan. 13, 1920.

Application filed March 7, 1918. Serial No. 221,016.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Stock; and I do hereby declare the following to be a full, clear, and exact description of the invention, such as will enable others skilled in the art to which it appertains to make and use the same.

This invention relates to improvements in water devices for stock,—one object of the invention being to provide a simple and efficient device of this type in which the supply of water to the bowl and its quantity therein shall be controlled automatically, and to so construct a watering device comprising one or more bowls and a water supply chamber communicating therewith, that said bowl or bowls and the water supply chamber, together with parts of the water supply controlling means may be lowered or dropped, whereby various parts of the interior of the device may be exposed to facilitate emptying and cleaning.

A further object is to provide simple and efficient means to effect the retention of the parts in normal position and to facilitate the dropping of the bowl or bowls and attached parts.

With these and other objects in view, the invention consists in certain novel features of construction and combinations of parts as hereinafter set forth and pointed out in the claims.

In the accompanying drawings, Figure 1 is a plan view, partly in section, and Fig. 2 is a sectional view on the line 2—2 of Fig. 1.

1 represents a bracket or support provided with a valved fount comprising a casing 2 having an inlet duct 3 and a spout 4, between which a valve 5 is located. The valve 5 may be carried by a cage 6 screwed into the casing 2 and provided at its lower end with a seat for the valve, the stem 7 of said valve projecting through and above the upper end of said cage. A spring 8 may be located within the cage 6 and connected with the stem of the valve in a manner to close the latter against its seat.

A pipe coupling 9 may be suitably secured to the bracket 1 so as to communicate with the inlet duct 3 of the valve casing, and said coupling is adapted for the reception of a pipe from a suitable source of supply.

A bowl structure is supported by the bracket 1 (as hereinafter explained) and in the embodiment of the invention shown in the drawings, this bowl structure comprises two bowls 10—10 and an interposed receptacle 11,—all of which may be made in a single casting. This structure is normally so supported by the bracket 1 that the valve chamber will project into the receptacle 11 so as to discharge thereinto, and the walls of said receptacle are provided at or near the bottom thereof with ports 12 communicating with the bowls 10. For effecting a pivotal or hinged connection of the bowl structure with the bracket 1, the latter may be provided with lugs 13 with which lugs 14 on the bowl structure under the bottom of the intermediate receptacle 11, are pivotally connected by means of a pivot pin 15. A cover 16 is provided for the intermediate receptacle 11 and this cover is pivoted at one end to the upper end of the bracket 1 as indicated at 17. One or more lugs such as indicated at 18 project downwardly from the cover 16 and engage a lug or lugs 19 projecting inwardly from the walls of the receptacle 11. Thus it will be seen that the cover 16, with the lugs 18 and 19 constitute latching means which operate normally to retain the bowls 10 and receptacle 11 in operative position.

A lever 20, provided at its lower end with a float 21, is located within the intermediate receptacle 11, and this lever is provided at its upper end with a horizontal sleeve 22 disposed between the walls of said receptacle 11 and pivotally connected therewith by means of a pivot pin 23,—said lever being thus so disposed that a portion thereof near its pivotal support, will be located over the valve stem 7 so as to engage the same.

With the construction and arrangement of parts above described, it will be seen that water will be maintained in the bowls 10 in such quantity as will be automatically controlled by the valve 5 through the medium of the float lever.

When it is desired to empty the bowls and to render them and the receptacle 11 together with the parts contained, in the latter, readily accessible for cleaning,—the operator will raise the latch cover 16. This will disengage the lugs 18 and 19 and permit the bowls 10 and receptacle 11 to drop, the float lever descending with the receptacle and bowls, and exposing the valve mechanism and outlet spout portion of the valve casing.

Having fully described my invention what I claim as new and desire to secure by Letters-Patent, is:

1. In a watering device, the combination with a support, of a structure pivotally attached thereto and comprising a bowl and a receptacle communicating with each other, a valved fount, a float lever pivotally mounted in and carried by said receptacle, said float lever being operatively associated with the valve of the valved fount, and a cover for said receptacle pivoted to said support and having a part coöperative with a part on the receptacle to form a latch device.

2. In a watering device, the combination with a support, of a structure comprising a plurality of bowls and a water receptacle communicating with said bowls, means constituting a pivotal connection between said structure and support, a valved fount, a combined cover for the receptacle and latch device for the pivoted structure and having pivotal connection with said support, and a float lever pivotally mounted in and carried by said receptacle and operatively associated with the valve of said valved fount.

3. In a watering device, the combination with an upright bracket and a valved fount between the upper and lower ends of said bracket, of a combined water receptacle and bowl communicating with each other and having its lower portion pivotally connected at one end with the lower portion of said bracket, a float device mounted in said receptacle and operatively associated with the valve of the valved fount, and a connecting member between the upper portion of the receptacle and the upper portion of said bracket independently of said float, said connecting member being pivoted to one of said parts and removably connected with the other and adapted normally to retain the combined receptacle and bowl in a horizontal position in front of said bracket.

4. In a watering device, the combination of a bracket, a valved fount carried thereby, an integral structure comprising two bowls and a water receptacle interposed between said bowls and communicating with both, means pivotally connecting said structure to the bracket in such position that the fount will discharge into the intermediate receptacle, and a cover for said receptacle hinged to the bracket and removably connected with said intermediate receptacle.

In testimony whereof, I have signed this specification in the presence of two subscribing witnesses.

HUGO C. RASSMANN.

Witnesses:
H. R. VETTER,
E. J. LAWRENCE.